United States Patent
Ur

(10) Patent No.: US 11,281,425 B2
(45) Date of Patent: Mar. 22, 2022

(54) STREAMING OF MULTI-LOCATION LIVE EVENTS

(71) Applicant: Shmuel Ur Innovation LTD., Shorashim (IL)

(72) Inventor: Shmuel Ur, Shorashim (IL)

(73) Assignee: SHMUEL UR INNOVATION LTD., Shorashim (IL)

( * ) Notice: Subject to any disclaimer, the term of this patent is extended or adjusted under 35 U.S.C. 154(b) by 0 days.

(21) Appl. No.: 17/324,607

(22) Filed: May 19, 2021

(65) Prior Publication Data

US 2021/0365234 A1    Nov. 25, 2021

Related U.S. Application Data

(60) Provisional application No. 63/027,386, filed on May 20, 2020.

(51) Int. Cl.
| | |
|---|---|
| *H04N 7/15* | (2006.01) |
| *G06F 3/16* | (2006.01) |
| *G10L 21/0208* | (2013.01) |
| *G10L 25/57* | (2013.01) |

(52) U.S. Cl.
CPC .......... *G06F 3/165* (2013.01); *G10L 21/0208* (2013.01); *G10L 25/57* (2013.01); *H04N 7/15* (2013.01)

(58) Field of Classification Search
CPC ........ G06F 3/16; H04N 7/15; H04N 21/4307; G10L 25/57; G10L 21/0208; H04M 3/567
USPC ............................................. 348/14.01–14.08
See application file for complete search history.

(56) References Cited

U.S. PATENT DOCUMENTS

| | | | | |
|---|---|---|---|---|
| 10,086,291 | B1 * | 10/2018 | Wisler | .................... A63F 13/75 |
| 2011/0252157 | A1 * | 10/2011 | Garcia, Jr. | .......... H04L 12/1827 709/231 |
| 2017/0127145 | A1 * | 5/2017 | Rajapakse | ........ H04N 21/85406 |

* cited by examiner

*Primary Examiner* — Melur Ramakrishnaiah
(74) *Attorney, Agent, or Firm* — Tutunjian & Bitetto, P.C.

(57) ABSTRACT

A method, apparatus, and product comprising synchronizing an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises: obtaining a first audio stream from the first group; providing the first audio stream to the second group; obtaining a second audio stream from the second group; and providing the second audio stream to the third group.

20 Claims, 6 Drawing Sheets

STREAMING OF MULTI-LOCATION LIVE EVENTS

CROSS-REFERENCE TO RELATED APPLICATION

This application claims the benefit of Provisional Patent Application No. 63/027,386, titled "Streaming Of Multi-Location Live Events", filed May 20, 2020, which is hereby incorporated by reference in its entirety without giving rise to disavowment.

TECHNICAL FIELD

The present disclosure relates to streaming of audio streams between multi-location participants in general, and to synchronizing media streams obtained from participants in multiple location, in particular.

BACKGROUND

In the physical non-virtual world it is common that people sing together in a choir, a church, an orchestra, or the like. It is also common to attend a performance in which there are multiple performers, from 2 to hundreds or even thousands, and an audience.

BRIEF SUMMARY

One exemplary embodiment of the disclosed subject matter is a method comprising: synchronizing an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises: obtaining a first audio stream based on one or more first audio records from one or more participants of the first group, wherein the one or more first audio records are obtained via the virtual conference system; providing the first audio stream to the second group via the virtual conference system, wherein the first audio stream is not provided to the one or more participants of the first group and is not provided to the third group, whereby one or more participants of the second group are enabled to consume content of the first audio stream; obtaining a second audio stream based on one or more second audio records from the one or more participants of the second group and based on the first audio stream, wherein the one or more second audio records are obtained via the virtual conference system; and providing the second audio stream to one or more participants of the third group via the virtual conference system, whereby the second audio stream is not provided to the first group, whereby the second audio stream is not provided to the second group, whereby the one or more participants of the third group are enabled to consume the second audio stream.

Optionally, the method comprises iteratively performing said synchronizing for each time segment of the audio-based performance, wherein participants of the first and second groups are enabled to continue to perform the audio-based performance without interruption and within a time difference between the first group and the second group.

Optionally, the pre-determined order of the groups provides an order of the groups from a minimal number of participants to a maximal number of participants.

Optionally, the method comprises providing a background sound to the first group, whereby the one or more participants of the first group are enabled to consume the background sound during said obtaining the first audio stream.

Optionally, the method comprises removing the background sound from the first audio stream prior to said providing the first audio stream to the second group.

Optionally, said obtaining the second audio stream comprises: obtaining the one or more second audio records from the one or more participants of the second group, wherein the one or more second audio records are obtained within a maximal latency threshold, whereby dropping at least one audio record received after the maximal latency threshold; and merging the first audio stream with the one or more second audio records, thereby obtaining the second audio stream.

Optionally, the audio-based performance comprises a sing-along virtual event.

Optionally, the virtual conference system comprises a video conference system.

Optionally, the remote locations comprise one or more of the group consisting of: different countries, different cities, different streets, different apartments, and different rooms.

Optionally, the first group comprises an initial pace setter, wherein the pace setter is not exposed to audio records from any other participant.

Optionally, a last group of the pre-determined order comprises an audience, whereby the audio-based performance is provided to the audience.

Another exemplary embodiment of the disclosed subject matter is an apparatus comprising a processor and coupled memory, said processor being adapted to: synchronize an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises: obtaining a first audio stream based on one or more first audio records from one or more participants of the first group, wherein the one or more first audio records are obtained via the virtual conference system; providing the first audio stream to the second group via the virtual conference system, wherein the first audio stream is not provided to the one or more participants of the first group and is not provided to the third group, whereby one or more participants of the second group are enabled to consume content of the first audio stream; obtaining a second audio stream based on one or more second audio records from the one or more participants of the second group and based on the first audio stream, wherein the one or more second audio records are obtained via the virtual conference system; and providing the second audio stream to one or more participants of the third group via the virtual conference system, whereby the second audio stream is not provided to the first group, whereby the second audio stream is not provided to the second group, whereby the one or more participants of the third group are enabled to consume the second audio stream.

Yet another exemplary embodiment of the disclosed subject matter is a computer program product comprising a non-transitory computer readable medium retaining program instructions, which program instructions when read by a processor, cause the processor to: synchronize an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises: obtaining a first audio stream based on one or more first audio records from one or more participants of the first group, wherein the one or more first audio records are obtained via the virtual conference system; providing the first audio stream to the second group via the virtual conference system, wherein the first audio stream is not provided to the one or more participants of the first group and is not provided to the third group, whereby one or more participants of the second group are enabled to consume content of the first audio stream; obtaining a second audio stream based on one or more second audio records from the one or more participants of the second group and based on the first audio stream, wherein the one or more second audio records are obtained via the virtual conference system; and providing the second audio stream to one or more participants of the third group via the virtual conference system, whereby the second audio stream is not provided to the first group, whereby the second audio stream is not provided to the second group, whereby the one or more participants of the third group are enabled to consume the second audio stream.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
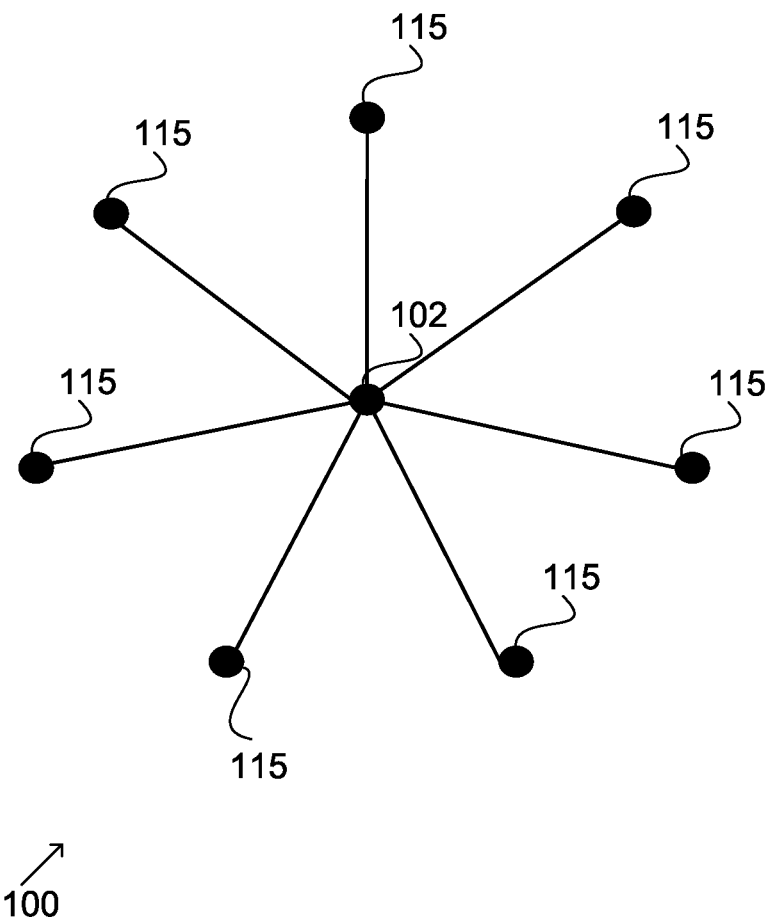
FIG. 1 shows a schematic illustration of an exemplary architecture in which the disclosed subject matter may be utilized, in accordance with some exemplary embodiments of the disclosed subject matter.

One technical problem dealt with by the disclosed subject matter is to enable multiple users in different physical locations to perform a virtual performance together, e.g., in real time or near real time. It may be desired to enable multiple users in different physical areas to perform an audio-based performance via a virtual medium. For example, the performance may include a virtual sing-along event (also referred to as "community singing" or "group singing") for performers that are present in remote cities, homes, rooms, countries, or the like. As another example, the performance may include a virtual rehearsal of a band, a choir, or the like, with members in remote locations. As another example, the performance may include a virtual performance to an audience, with performing members that are located in remote locations.

In some exemplary embodiments, usage of a conventional video conference techniques with multiple performers such as singers or players on different locations may not work, e.g., due to latency issues between media streams of the different performers, which may occur due to communication processing, network congestion, remote geographical locations, network connectivity properties, or the like. When using conventional virtual conference tools such as ZOOM™, SKYPE™ and TEAMS™, the audio stream from each participant may arrive at the other participants in different times, producing a result that is not synchronized and is unusable for audio performances. In some exemplary embodiments, virtual conferencing may work well if one person is talking or performing at a time, or if a performance of multiple people in one location is streamed from one end device, but otherwise the latency may cause sever audio issues. In some exemplary embodiments, audio-based performances may be usable or perceivable only in case the sounds produced by different performers are synchronized in time and do not contradict each other, e.g., enabling a harmony or musical structure of the performed piece to be retained.

In some exemplary embodiments, a virtual conference system, also referred to as a video conference, a video call, or a video chat, enables users in different locations to hold face-to-face meetings without needing to move to a single location together. In some exemplary embodiments, video conferencing may be conducted using web cameras connected to a user device, cameras built into a user device such as into a laptop, a tablet, a desktop computer, or the like. In some exemplary embodiments, video conferencing may be conducted using smartphones equipped with cameras. In some exemplary embodiments, video conferencing may be conducted without utilizing cameras, such as using audio communication alone, e.g., by using ZOOM™ without turning on a camera. In some exemplary embodiments, video conferencing may be conducted without utilizing a recorder, such as by using ZOOM™ without activating a microphone. For example, a virtual conference system may conduct a virtual meeting between one or more participants that utilize a camera to provide a video, and/or one or more participants that do not use a camera. In some cases, a software-based platform of the virtual conference system may be used to communicate the video or audio records of the participants between each other over internet protocols, or over any other network protocol. In some cases, the software-based platform may communicate the video or audio records between the participant via a video processing server or directly, enabling a software at each participant's device to process the communications independently. It may be desired to enable multiple people in remote locations to participate together in a real-time audio-based event or performance, such as singing, playing, praying, or the like.

Referring now to FIG. 1 showing a schematic illustration of a structure of a virtual conference system, in accordance with some exemplary embodiments of the disclosed subject matter.

In some exemplary embodiments, a structure of communication channels in a virtual conference system such as a video conference may be represented with a star shape such as Star 100. In some exemplary embodiments, Star 100 may depict communication channels between a Central Control 102, and multiple End Devices 115 of participants. In some exemplary embodiments, a single End Device 115 may be used simultaneously by multiple users, such as by singing together to a microphone of a single End Device 115. Accordingly, the term participant may refer to any number of people that use a single end device to participate in a virtual conference. In some exemplary embodiments, Central Control 102 may comprise a software-based platform that is configured to control and handle the communications between the users of End Devices 115. In some exemplary embodiments, Central Control 102 may be an intermediate software in the center of the communications such as a central server with a video conferencing software, a software portion in each End Device 115, or the like. In some exemplary embodiments, the communications between End Devices 115 may be performed without the use of a central server by using a Session Initiation Protocol (SIP), employing peer-to-peer channels, or the like. In such architecture, Central Control 102 may comprise the video conferencing software (or portions thereof) in each End Device 115, as the software in each End Device 115 may be viewed together as a central intermediate software that controls the communications between the participants.

In some exemplary embodiments, during a virtual conference session, the participating End Devices 115 may continuously or sequentially send and receive audio and/or video records from each other, by recording at the End Devices 115 or portion thereof a media record including a video of the user, an audio of the user, or the like, and transmitting the media record to Central Control 102, while simultaneously or subsequently obtaining from Central Control 102 media recordings of the remaining participants. In some exemplary embodiments, an End Device 115 may obtain streaming videos of the other participants from the Central Control 102, display the videos in a separate container for each participant, and combine the audios of all the participants to a single audio stream that can be provided to a participant utilizing the End Device 115. Alternatively, the audio streams from the participants may be provided separately to a participant utilizing the End Device 115, who may be enabled to hear all of the audio streams together, in the same time, as one audio sound.

In some exemplary embodiments, virtual conferences may suffer from time-lag problems on video or audio calls because of signal processing, internet congestion issues, or the like. In some exemplary embodiments, each media stream of a participant may be obtained at the remaining participants at slightly different times, which may not be noticeable in case one user is providing a main audio stream, e.g., in case one participant is speaking, playing an instrument, or singing in every moment. In some exemplary embodiments, the different audio delays of the audio transmissions may adversely affect a quality of a multi-location audio performance, producing a noisy and un-synchronized audio session.

In some exemplary embodiments, the audio delays between Central Control 102 and the End Devices 115 of all participants may or may not vary in length between participants. For example, a variance of delays between Central Control 102 and End Devices 115 may be large, e.g., above a threshold. In some exemplary embodiments, the audio records from the End Devices 115 may include various audio streams that are not synchronized with each other, which may be noticeable as they may be played and consumed simultaneously. In some cases, there may be different latencies to various participants, different latencies from various participants, or the like. In some cases, even in case two participants sing together and hear each other in a synchronized manner, their audience may hear their two voices out of synchronization due to different latency from the two singers to the audience. In some exemplary embodiments, multiple different or identical audio delays may disrupt the streamed audio of the virtual conference system and prevent from a small number of people, e.g., even two participants, to sing together in a synchronized non-noisy manner.

As an example, an audio delay between two participants may be identical, e.g., 0.05 seconds, enabling each participant to hear the voice of the other participant 0.05 seconds after the speech or sound is made. In some exemplary embodiments, both participants may attempt to sing a musical piece together. In some exemplary embodiments, upon the second participant starting to perform the musical piece, the first participant may hear the singing (or other voice performance) of the second participant in a delay of 0.05 seconds. In some exemplary embodiments, in case the first participant attempts to join in with the singing of the second participant, which he consumed or heard in a delay of 0.05 seconds, the first participant may sing the musical piece as well, which may be provided to the second participant with a delay of 0.1 seconds (0.05+0.05 seconds) from the moment that the second participant has started to perform the musical piece. In some exemplary embodiments, the delays between the singing may increase as the singing of the musical piece progresses.

A naïve solution may comprise creating a virtual audio-based performance such as an orchestra or a choir, by combining records of each participant to a single record. Every participant may record herself and send the recording back to a central station, where dedicated software can be used to stitch the different recording together. However, this method results with a recorded song, that is created after each part of the performance has occurred separately, without enabling the participants to participate in a shared real-time event. The resulting record is created in a substantial timeframe after the performances of each participant, after communicating each file to a central processing unit and processing the files to create a resulting record, without enabling a live or real time performance. Currently, due to latency issues, there is no known way to provide for a real-time solution for an audio-based performance with separated performers in remote locations using a virtual conference system.

Another technical problem dealt with by the disclosed subject matter is to synchronize a performance conducted by performers in multiple locations, without the latency of the virtual conference system affecting the performance. In some exemplary embodiments, it may be desired that the existence of latency between audio streams of participants will not have an impact on the quality of the final product, e.g., the final streamed output that may be provided to the audience. In some exemplary embodiments, a group of performers may desire to create a live performance for an audience when each performer is located in a different physical location, e.g., remotely from one another, under the constraints of latency of communications and even heterogenous latency.

Yet another technical problem dealt with by the disclosed subject matter is to enhance a User eXperience (UX) of consuming a performance conducted by performers that are located in remote locations, e.g., in locations that are remote and do not enable the performers to hear each other in the physical non-virtual world. It may be desired that an audience will be enabled to consume (e.g., hear) a resulting performance in real time, such as a short-time or immediately after each sound of performance is performed, in a seamless manner that is not interrupted, noisy, or the like. As an example, it may be desired that a performance including a 3-minute song that is sung by 300 participants, may be heard immediately, within a minute, or the like, in a seamless continuous and synchronized manner, by the performers, by an audience, or the like. It may be desired that the virtual performance will be transmitted to the participants at the time of occurrence, or in a close proximity to the time of occurrence, e.g., in real time, or the like. In some cases, it may be desired to generate a recording of the performance to be available immediately after the performance is completed.

One technical solution is to divide participants of a performance into ordered groups, and synchronize a performance of the groups' members according to a defined group order. In some exemplary embodiments, the performers may be divided into groups, e.g., automatically, manually, a combination thereof, or the like. In some exemplary embodiments, the performers may be divided into groups based on a role of the participants, geographical distances between the participants, user preferences, a number of users that are configured to be in each group, or the like. In some exemplary embodiments, at least some of the participants that are grouped into groups may desire to participate in a virtual performance such as a sing-along event from multiple locations, from multiple end devices, or the like. In some exemplary embodiments, each participant of a group may comprise a single user recording herself via her user device, multiple users recording themselves using a single user device, or the like. As an example, five singers may sing from a single location and may be considered as a single participant for the purpose of the division to groups.

In some exemplary embodiments, an order or hierarchy between the groups may be defined, configured, set, or the like, indicating an order of synchronization. In some exemplary embodiments, the hierarchy of the groups may be defined manually by the participants, automatically based on locations or roles of the participants, based on a size of each group, or the like. In some exemplary embodiments, participants may be divided into groups that increase in size, e.g., from a minimal number of participants to a maximal number of participants. As an example, in an event of 200 performers performing each from a different location, there may be 5 groups: group A of a single person, group B of ten people, group C of fifty people, group D of 50 people, and remaining performers—90 people, may be grouped in group E. In some exemplary embodiments, in case the performance is configured to be consumed by an audience, the audience may be set as the last group (e.g., a new group, group F, in the example above), or as one or more last groups. Additionally, or alternatively, a partial order may be defined between the participants, such as based on the groupings.

In some exemplary embodiments, a first initial group, also referred to as the "pace setter", may be configured to be relatively small, e.g., include one participant or participating device (referring to any number of users that participate via a single end device). In some cases, the pace setter may include a single person to ensure that a synchronized pace is dictated thereby. However, in some cases, the pace setter may include more participants. In some embodiments, the pace may be dictated by the pace setter. It is noted that in some embodiments, the pace to the performance may be set by a pre-recorded sound that is played to the first group, and not by the first group itself. In some cases, the pre-recorded sound or music may be played to the pace setter, to one or more remaining groups, or the like, effectively dictating the pace to the receiving groups. Additionally, or alternatively, the pre-recorded sound may be omitted and not provided to some or any groups. In such cases, the pace of subsequent groups may be dictated by the pace setter, whose pace, in turn, may or may not be dictated by the pre-recorded sound.

In some exemplary embodiments, each group may be activated iteratively, according to the defined hierarchy, from top down. In some exemplary embodiments, sound portions from the first group may be recorded, and each recorded portion that has a defined time segment may trigger a new iteration of group activations, according to the pre-defined order of the groups. In some exemplary embodiments, each activation of a group may be performed for a defined time segment of the performance, e.g., an identical time segment for all groups. In some exemplary embodiments, during a group activation, the group members may be provided with a previous media stream from previous groups (if any), with a background sound, or the like. In some exemplary embodiments, the group members may be enabled to perform an audio-based piece until a maximal latency threshold, such as while listening to the previous media stream and in correlation thereto.

For example, a first group member may sing a solo part of a song, and each portion of the sung solo that has a length that corresponds to the time segment, may be recorded and provided as a single stream to a second group, e.g., which may iteratively trigger activation of the following groups until the last performing group is activated for each song segment. Each group that receives a recorded audio stream, such as the second group members, may listen to the obtained audio stream and add its own performance thereto, e.g., play flutes together with the perceived solo. After a maximal latency threshold allocated for obtaining the audio performances elapses, the audio records of the second group may be merged with each other and with the previous media stream, and may be provided to a next group (if exists), which may be activated subsequently therefrom, and so on. In some exemplary embodiments, by propagating each portion of the first group's audio to the subsequent groups, each group may be enabled to perform continuously, while obtaining a continuous synchronized audio stream that merges the performance of the previous groups, e.g., in real time. In some exemplary embodiments, each performance of a group may have an increasing latency with respect to the performance of the first group, but the latency may not adversely affect the experience and real time performance of each group, as it may not be noticeable.

One technical effect of utilizing the disclosed subject matter is to enable multiple performers in different locations to perform a synchronized virtual performance with each other, in real time. In some exemplary embodiments, the disclosed subject matter may be useful for any multi-location event occurring simultaneously, at overlapping timings, at synchronized timings, or the like, in different locations, such as a concert, a musical show, a theater show, a live performance, a group prayer, or the like.

Another technical effect of utilizing the disclosed subject matter is to synchronize a latency between different groups of participants, by separating the participant to groups with different latencies with respect to the pace setter, thereby eliminating the adverse effect of the latencies.

Yet another technical effect of utilizing the disclosed subject matter is to enable an audience in different locations to consume a synchronized virtual audio-based performance occurring in separate locations, in real time, in accordance to the latency setting of the audience group. In some cases, although the audience group may be enabled to consume and hear the audio stream at a set latency from the actual occurrences of the sounds, the audio performance may be consumed in a synchronized and continuous manner without the audio being able to notice that a small latency separates between different participating groups.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 2:
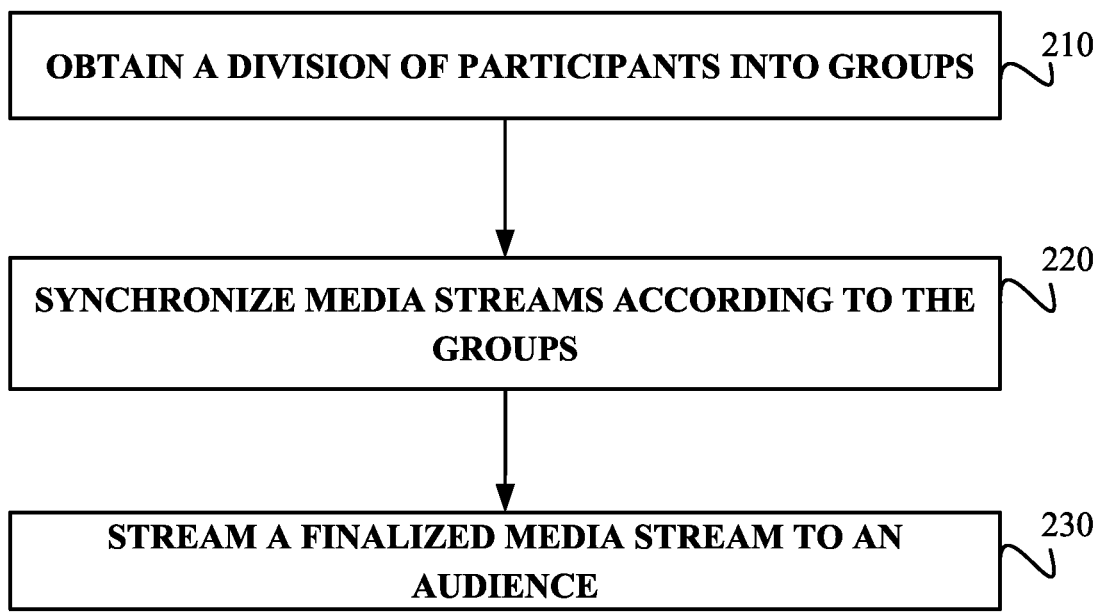
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, a division of the participants into ordered groups may be obtained. In some exemplary embodiments, the participants and audience of the virtual conference or performance may be divided into groups, tiers, or the like, that are ranked according to an order or a hierarchy. In some exemplary embodiments, members of a group may belong to a same "delay" group, having a same delay with respect to the remaining groups. For example, each group in the defined order may have a different latency with respect to the pace setter, the latency increasing in size as the group is ranked lower in the order of groups. In some exemplary embodiments, the ordering of participants into ordered groups may enable to synchronize performances of groups.

In some exemplary embodiments, an audio-based performance such as a sing-along virtual event or a band rehearsal may be synchronized between groups that are ordered in a pre-determined order. In some exemplary embodiments, the audio-based performance may be streamed in real time via a virtual conference system comprising a camera, a video software, or the like. In some exemplary embodiments, each of the groups may comprise one or more participants, at least some of which may be physically located in remote locations, such as in different countries, different cities, different streets, different apartments, different rooms, or the like. In some exemplary embodiments, the remote locations may be sufficiently remote so as not to enable remotely located participants to hear each other in a non-virtual manner. In some exemplary embodiments, the pre-determined order of the groups may indicate that a first group immediately precedes a second group, the second group immediately precedes a third group, and so on.

In some exemplary embodiments, the division of the groups may be determined based on a role of the participants, according to a dependency of the participants in audio from other participants, according to a geographical location of the participants, a quality rank of the participants, capabilities of the participants, or the like. In some exemplary embodiments, groups may be determined and ordered according to a quality rank of the members. In some exemplary embodiments, there may be a minimal quality threshold per group, and participants may be allocated to a group in case their quality rank complies with the group threshold. For example, the quality rank of a participant may indicate whether the participant can sing in tune, whether the participant can play an instrument in tune, whether the participant produces a loud sound, whether the participant can perform independently, or the like. In some exemplary embodiments, the quality threshold may deteriorate as the group is ranked lower in the hierarchy, e.g., implying that the group will be activated later in time. In this manner, the first group, which may be heard by the remaining groups, may comprise one or more participants that are considered of a high enough quality that they may be able to set the tone or pace of the performance in a good manner.

In some exemplary embodiments, groups may be determined and ordered according to delay or latency-related information of the participants. In some exemplary embodiments, statistical means may be employed to include sufficient number of participants in each group that would have latencies that are below the relevant time threshold of the group. In some exemplary embodiments, each group may have a latency threshold, which may increase as the group is ranked lower in the hierarchy. In some exemplary embodiments, participants may be allocated to a group in case they are estimated to comply with its latency threshold. In some exemplary embodiments, separating the participant to groups according to their communication latency may ensure that the important roles, of the groups that are first in order, are performed swiftly and reliably. In some exemplary embodiments, an estimated latency of participants may be determined based on geographical locations of the participants, based on communication channels utilized by the participants, based on network congestion, based on historical latency measurements, or the like, which may affect their latency. For example, participants that are located in entirely different geographical locations, e.g., in different countries, in a distance that overpasses a threshold, or the like, may not be allocated to a same group, as the large distance may result with unequal communication processing.

In some exemplary embodiments, the division into groups may be performed manually, automatically, a combination thereof, or the like. In some exemplary embodiments, the selection of the groups may be adjusted dynamically, such as during the performance in real time. As an example, during the performance, the quality of the performance of a member, such as the quality of her singing, may be evaluated, and accordingly, the member may be moved to a different group (e.g., a higher-ranked group, if she performs well, or a lower-ranked group, if she performs poorly). As another example, during the performance, the latency of the member may change, such as due to interruptions in the communication channel utilized by the member. The disclosed subject matter may move the member to a different group having a larger or shorter maximal latency threshold for obtaining user records, that may be suitable to the newly identified expected latency of the member. As another example, during the performance, the latency of the member may change, such as due to the member traveling to a different geographical area during the performance, e.g., via a ground vehicle, an air vehicle, or the like. The disclosed subject matter may move the member to a different group having a larger or shorter maximal latency threshold, that is suitable to the newly identified expected latency of the member that is associated to its new geographical location.

Figure 3:
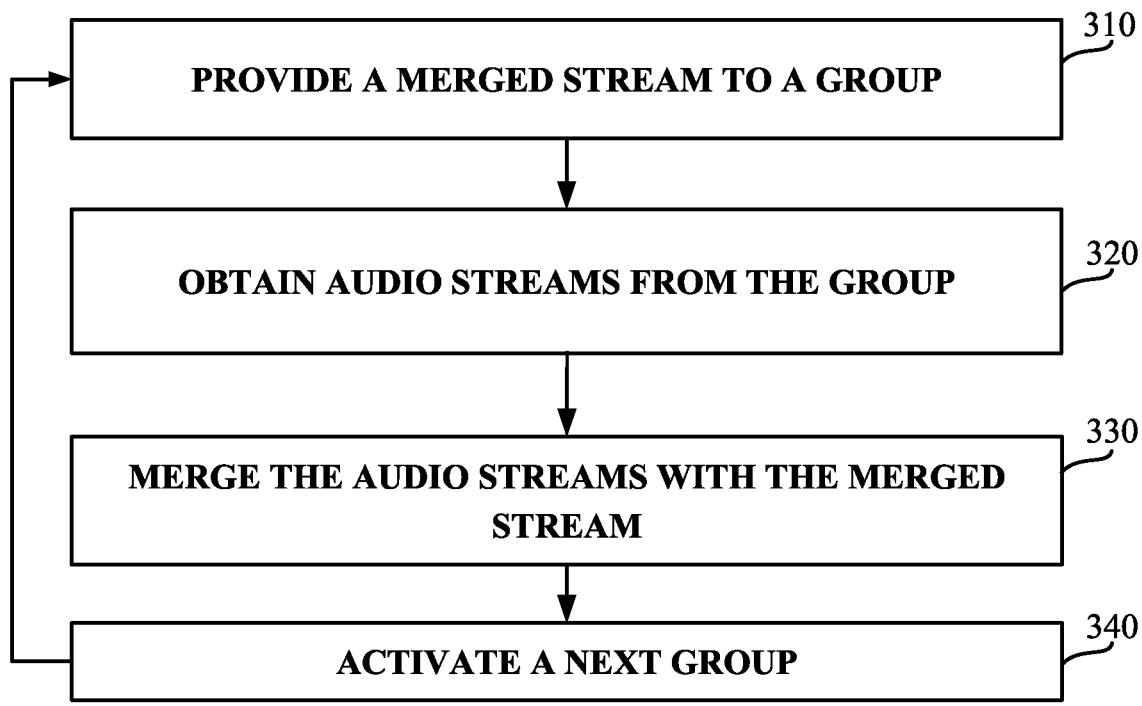
FIG. 3 shows a flowchart diagram of a method, in accordance with some exemplary embodiments of the disclosed subject matter.

On Step 220, media streams may be synchronized by performing the method of FIG. 3 for each segment of the performance of the first initial group. In some exemplary embodiments, a length of the segments may be determined or obtained, and used to extract audio segments from the first group that have a defined duration. Each extracted segment may be extracted in real time and trigger the method of FIG. 3, e.g., trigger activation of the subsequent groups to obtain a merged audio that is based on the extracted segment. In some exemplary embodiments, the steps of FIG. 3 may be implemented iteratively for media segments with a defined duration, such as for 10 second media segments, 30 second media segments, 60 second media segments, or the like. In some exemplary embodiments, the extracted audio segment may be provided from the first group (the pace setter) to a subsequent group, and processed versions thereof may be forwarded to the remaining subsequent groups according to the defined group order. In some exemplary embodiments, the process may be performed iteratively on all segments of the audio portion that is being performed by the pace setter, by one group after the other.

In some exemplary embodiments, the pace setter may be a participant whose timing is important, as the audio segments of the pace setter are configured to trigger the consecutive processing of the segment at the remaining groups, until the performed musical piece is fully performed by all of the performing groups. In some exemplary embodiments, the method of FIG. 3 may be implemented sequentially for one group after each other, each iteration including activating a group for a defined period during which media records are obtained, merged (for the second group and on) and provided to a consecutive group. In some exemplary embodiments, the media records from each may be obtained, accumulated, recorded, or the like, until a maximal latency threshold elapses, e.g., a time threshold of Step 320 (FIG. 3), a timeframe that is set based on the duration of the audio segment, or the like. In some exemplary embodiments, the time threshold may be set to be associated with the size of the time period allocated for the active group. For example, in case an active group is configured to be active for 4 seconds, the time threshold for obtaining media records from a group may be set to be less than 4 seconds, e.g., 2 seconds, 3 seconds, or the like.

In some exemplary embodiments, the first group in the hierarchy (the pace setter) may be exposed to a reduced experience, as its members may not obtain audio streams from other participants and may in fact be performing or signing alone, by themselves, or the like. In some exemplary embodiments, the following groups in the hierarchy may obtain merged audio stream from the previous groups. In some exemplary embodiments, a last group may comprise an audience, which may or may not participate in the performance. In some exemplary embodiments, in case it is desired that at least a portion of the audience will hear the crowd, the audience may be divided into separate groups, the sound first of which may be streamed to the second.

For example, the disclosed subject matter may be utilized to stream a live performance of a band. In such a case, a first group may be a pace setter, a second group may comprise the remaining members of the band, and a third group may be the audience. In some exemplary embodiments, the pace setter may be any participant that sets the tone or pace to the other members of the band. For example, in a 10-man band, the first group may include 1 member of the band and the second group may include the remaining 9 members of the band. In some exemplary embodiments, in case it is desired that some of the audience will hear the crowd, the third group may be divided into sub-groups, e.g., C1 and C2. The sound of the sub-group C1 may be streamed to the sub-group C2, or vice versa.

In some exemplary embodiments, synchronizing an audio-based performance may be performed for each portion or segment of a performance of a first group, such as by iteratively obtaining an audio track from a group, providing the stream to a next group, and recording an addition to the audio track from the consecutive group, e.g., iteratively. In some exemplary embodiments, the first group may comprise a pace setter, which may not be exposed to audio records from any other participants. In some exemplary embodiments, a last group of the pre-determined order may comprise an audience, to which the audio-based performance may be provided.

In some exemplary embodiments, an iteration may start by obtaining a first audio stream, e.g., a single stream, from the first group, such as based on one or more first audio records from one or more participants of the first group. In some exemplary embodiments, obtaining audio records may comprise recording audio, accumulating recorded audio, or the like. In some exemplary embodiments, the first audio records from the first group may be obtained via the virtual conference system, e.g., via a microphone of an end device, a recording device, or the like. In some exemplary embodiments, the first audio stream may comprise a performance of a portion of a musical piece, or of any other audio-based piece, e.g., the first 5 second of a performance of a song. In some exemplary embodiments, the first audio stream may be provided to a subsequent second group via the virtual conference system. In some exemplary embodiments, members of the second group may be enabled to consume content of the first audio stream, such as by listing to it, while members of the first group may not be enabled to consume content of the first audio stream. In some exemplary embodiments, groups that are subsequent to the second group, such as a third group, may also not be enabled to consume content of the first audio stream.

In some exemplary embodiments, a second audio stream may be obtained from the second group, e.g., based on one or more second audio records from the participants of the second group, based on the first audio stream, or the like. In some exemplary embodiments, the second audio stream may be obtained via the virtual conference system, e.g., by recording members of the second group performing the same portion of the musical piece that was performed in the first audio stream, such as while consuming (e.g., listening to) the first audio stream. In some exemplary embodiments, the second audio stream may be obtained as a single output stream by obtaining the one or more second audio records from the one or more participants of the second group, and merging the first audio stream with the one or more second audio records from the second group. In some exemplary embodiments, the one or more second audio records may be obtained within a maximal latency threshold. In some cases, an audio record from a member of the second group that is received after the maximal latency threshold, may be dropped and may not be merged to create the second audio stream.

In some exemplary embodiments, the second audio stream may be provided to one or more participants of a third subsequent group via the virtual conference system, e.g., without providing the second audio stream to the first or second groups, or to groups that are subsequent to the third group. In some exemplary embodiments, the members of the third group may be provided with the second audio stream, enabling them to hear and consume the second audio stream without having access to the first audio stream. In some exemplary embodiments, the next iterations may be performed similarly, for a plurality of groups in the latency hierarchy, until the group comprises the audience or is a last group. In some exemplary embodiments, participants of the first and second groups may be enabled to continue to perform the audio-based performance without interruption, e.g., continuously, within a time difference between the first group and the second group. In some exemplary embodiments, the time difference may correspond to a time between a performance of a musical segment (e.g., part of a musical piece or song) at the first group, and the performance of the same musical segment at the second group.

In some exemplary embodiments, the audio synchronizing may be performed iteratively for each segment (e.g., time segment) of the audio-based performance. In some exemplary embodiments, performing each portion of the musical piece in a sequential manner, according to the order of the groups, may create a latency difference between the groups. In some exemplary embodiments, the first group may perform all the segments of the musical piece immediately, without a latency, and each subsequent group may be configured to perform a segment of the musical piece after an increasing time delay, that is increased every subsequent group in the defined order.

In some exemplary embodiments, obtaining the first audio records from the first group, obtaining the second audio records from the second group, and so on, may be performed during a defined timeframe, such as a maximal latency threshold that corresponds to the duration of the audio segment that is being performed, which may be set to comprise a time period that is shorter than the time period that is allocated in total for each active group. In some exemplary embodiments, obtaining audio records from a group, e.g., the first audio records from the first group, may be performed for a defined timeframe, e.g., until a first maximal latency threshold. In some exemplary embodiments, obtaining the second audio records from the second group may be performed for a defined second timeframe, e.g., until a second maximal latency threshold, which may or may not be identical to the first timeframe.

In some exemplary embodiments, a background sound may be provided to the first group, the second group, or any subsequent group, e.g., during obtaining the audio streams therefrom. For example, background music may be provided and played to a group member while the group member performs an audio performance, e.g., enabling her to sing according to or along with the background sounds. In some exemplary embodiments, prior to providing the audio stream to the subsequent group, the background sound may be removed from the audio stream, e.g., in case the background sound is not intended to be forwarded a next group, is intended to be provided separately from the audio stream, or the like. For example, the background sound may be removed during a merging process.

In some exemplary embodiments, the pre-determined order of the groups may define an order between the groups from a minimal number of participants, e.g., in the first group, to a maximal number of participants, e.g., in the last group. In some exemplary embodiments, each group in the pre-determined order may increase in size of participants with respect to a previous group. In some exemplary embodiments, each group in the pre-determined order may not decrease in size of participants with respect to a previous group. Alternatively, any other allocation of participants to groups may be performed. For example, the second and third groups in the order may have an equal number of members.

On Step 230, a finalized media stream may be generated, created, or the like, and provided to the audience. In some exemplary embodiments, a last group of the latency hierarchy may comprise an audience, to which the audio-based performance may be provided, intended, or the like. In some exemplary embodiments, the audio stream to the last group may comprise merged streams of all of the performers, in a synchronized manner.

In some exemplary embodiments, in some cases, Step 230 may not be performed. For example, in case of a band rehearsal, there may not be an audience. In some exemplary embodiments, the synchronized media stream may be recorded, retained, or otherwise stored for any future usage.

Referring now to FIG. 3 showing a flowchart diagram of a method, in accordance with some exemplary embodiments of the disclosed subject matter.

On Step 310, one or more media streams may be provided to a group that is active. In some exemplary embodiments, the group may be activated for a defined period, after which a next group in a hierarchy of groups may be activated for an identical or different period. In some exemplary embodiments, the active group may comprise one or more participants that are configured to provide an audio record as part of a combined performance of multiple groups. For example, the active group may comprise participants that are configured to sing, to play an instrument, to perform real-time actions that create a sound, that may or may not be associated with music, which may be recorded by a virtual conference system and utilized as part of a live streamed performance.

In some exemplary embodiments, the participants of the active group may be provided with one or more previous media streams such as a merged media stream of previous groups, background music, instruction indications, assisting sounds, or the like. In some exemplary embodiments, the one or more previous media streams, when played to the participants, may enable the participants of the active group to join in with the played sounds such as by singing along, playing an instrument along with the played sounds, utilizing indications or instructions for performing a role in the performance, or the like. In some exemplary embodiments, the process of obtaining one or more media streams, processing them, and providing a stream to a group may be managed by an intermediate control, a central server, a centralized entity, or the like, such as Central Control 102 (FIG. 1).

In some exemplary embodiments, for any hierarchy level or order rank of the active group, background streams may or may not be configured to be provided as part of the performance. In some exemplary embodiments, background media may comprise pre-recorded music tracks, video or audio cues, background music, instruction sounds, beat sounds, or the like. In some exemplary embodiments, background streams may be configured to be provided as a separate record that is to be merged with the performance, or in combination with the live performance that includes the played background sounds. In some cases, the background media may comprise an audio stream with timing marks for the performing members. As an example, the provided background streams may comprise instruction sounds or indications that are configured to assist the members of the group with their performance, without being intended to be heard by other groups or by an audience. As another example, the provided background streams may comprise instruction sounds or indications that are configured to assist the group members with their performance, and may be intended to be heard by a subsequent group but not by the audience. As another example, the provided background streams may be provided to first and second groups, e.g., to instruct them with the performance, and may be removed from the stream that is provided to the subsequent group, e.g., the third group. In some cases, background music may not be forwarded to a participants of a next group automatically, such as by means of a virtual conference that may be configured to remove echo sounds that are not produced by the user. Alternatively, the background sound may be removed by an agent that is external to the means of the virtual conference.

In some exemplary embodiments, in case the active group is not the first group in a hierarchy of groups, e.g., is second in the hierarchy, third, fourth, or the like, the active group may obtain a previous media stream that comprises a merged audio track of the previous groups' performances. In some exemplary embodiments, the previous media stream may comprise a media stream that is obtained from the preceding groups in the hierarchy that are higher up in the hierarchy, e.g., in relation to the active group. In some exemplary embodiments, the previous media stream may be generated based on the performances of the preceding groups. For example, in case the active group comprises a group of violin players and the previous groups comprise groups of piano and bass players, the members of the third group may join in the performance of the piece by listening to the record of the previous groups and performing the violin portion along with the perceived piano and bass music. In some exemplary embodiments, the participants of the active group may or may not obtain one or more additional audio tracks such as background sounds that may or may not be configured to be heard by an audience, background sounds that may or may not be configured to be heard by a subsequent group, or the like.

In some exemplary embodiments, in case the background media from a previous group is not configured to be provided to the active group, the background media may be cancelled or extracted from the previous media stream that is provided to the active group members. For example, excluding the background media from the previous media stream may be performed by subtracting the background media from the recordings of the previous groups. In some exemplary embodiments, removing a background sound may be performed in case a copy of the background sound is available to the removing entity, e.g., the intermediate control.

In some exemplary embodiments, in case the active group is a first group (also referred to as the "pace setter") in a hierarchy of groups, the one or more participants of the group may not be provided with the one or more previous media streams, e.g., as the active group may comprise the first group prior to any other group activation. In some exemplary embodiments, the first group may comprise one or more participants that are not configured to hear the remaining groups of participants but are configured to be heard by all of the remaining groups. For example, the first group may comprise participants that are configured to set a pace or beat of the performance, or participants that are configured to perform any other role of the performance. In some exemplary embodiments, in some cases, the participants of the first group may be provided with the one or more background streams in the absence of a previous audio stream from previous group performances. For example, the pace setter may be a solo singer, and may be provided with background music such as a beat that may be played at the background of her performance.

On Step 320, after providing the previous media stream to each participant of the active group, the previous media stream may be consumed, played, executed, heard, or the like, and audio sounds from the active group may be recorded, obtained, accumulated, or the like. In some exemplary embodiments, participants in the active group may produce one or more audio sounds, such as by singing, playing a musical instrument, or the like, according to their role in the performance or according to any other consideration. In some exemplary embodiments, the performance of the participants may correlate with the previous media stream that is streamed thereto from previous groups, e.g., in case such groups exist. For example, a previous media stream and/or a background sound may be played to each member of the active group, and each member may sing or perform together with the played sounds, in synchronization therewith, or the like.

In some exemplary embodiments, the captured media from the active group may be processed to insert therein a timestamp markings indicating timing of the performance with respect to a baseline, e.g., with respect to the previous media stream. In some exemplary embodiments, the timestamp may be injected to the captured media at a start of the recording, at an end of the recording, or the like.

In some exemplary embodiments, the intermediate control may allocate a timeframe from a start time until a maximal latency threshold for receiving captured performances of participants from the active group, during which the participants from the active group may be expected to complete their audio performance of the desired piece portion, or the like. For example, the participants may be presented with audio of previous groups that comprise a performance of an audio portion, and the intermediate control may allocate a defined timeframe for members of the active group to add their addition to the audio portion. In case only a portion of the participants of the active group have performed along with the audio portion during the allocated timeframe, the intermediate control may process the audio inputs without waiting for the remaining members. In some exemplary embodiments, a duration of the timeframe of accumulating the audio records may be set to correspond to the time segment of the first group, randomly, based on one or more properties such as performance parameters of a virtual conference system, specifications or configurations of the end devices participating in the performance, configurations of an intermediate server, network or communication configurations, an estimated merging time for merging the audio records from the active group, or the like.

In some exemplary embodiments, a duration of the timeframe of accumulating the audio records may be set to be less that a total time period during which the group is configured to be active. As an example, in case a time period for which the group is activated is three seconds, then the timeframe duration may be set to comprise a shorter timeframe, e.g., a timeframe of 2 seconds, without interrupting the performance of the synchronization in a substantial manner. In some exemplary embodiments, a duration of the timeframe of accumulating the audio records may be set to comply with the defined time period for which the group is activated while enabling sufficient time for merging the recorded audio after the timeframe elapses.

In some exemplary embodiments, the timeframe duration may be set to comprise at least the expected mean roundtrip delay of the participants in the respective group. In some exemplary embodiments, the timeframe duration for accumulating the audio records from the active group may be set to be greater than the expected roundtrip delay of each member, e.g., indicating a communication delay between uploading and downloading audio streams from each member. For example, if the roundtrip delay is estimated to be, on average, 0.1 seconds, then the timeframe duration may be set to be a larger time period, e.g., 0.4 seconds, as this timeframe may be expected to allow most participants (if not all) to respond in time. As another example, in case the roundtrip duration is estimated to be, on average, 2 seconds, the timeframe duration may be set to be 5 seconds, enabling the group members to obtain and transmit at least some audio records.

On Step 330, the audio streams from the active group may be merged with each other and with a previous media stream (if exists). In some exemplary embodiments, the intermediate control may merge the previous media stream with the accumulated performances obtained on Step 320, to create a single merged audio record. In some exemplary embodiments, the intermediate control may stitch the media streams into a single audio stream such as based on the timestamps of each stream.

In some exemplary embodiments, the intermediate control may determine whether one or more background media streams were used in the active group performance. In some exemplary embodiments, in case the background media was used, and is not intended to be heard in the record, the background media may be removed such as by subtracting the background media from the recordings of the active group. In some exemplary embodiments, the background stream may be cancelled out by separating an audio track that comprises both the background stream and a performance from the active group, and removing the background stream from the track. Alternatively, the background sound may be identified in output audios of group members, and may not be added to a merged combination of the audio outputs from the group members. Alternatively, the background stream may be provided to the participants in a non-recorded manner, such as via headphones, which may not be included in the audio recording of the participants. Alternatively, virtual conference means may be configured to automatically cancel the background sound. In some exemplary embodiments, in case the background media is configured to be provided separately to the next group, the background media may be merged or stitched into the resulting audio stream that is designated to the next group.

In some exemplary embodiments, the intermediate control may merge the performance streams from the active group based on spatial locations of the group's performers. In some exemplary embodiments, spatial locations of players, such as of a physical choir, may dictate the perceived sound of the choir at the audience. In some exemplary embodiments, the distance volume and directions between the performers may play a role in the overall experience. In some exemplary embodiments, in order to take the spatial aspect into consideration, performers and other sound sources of the active group may be positioned in a virtual spatial map such as using a tool for spatial mapping, e.g., as described by "Placing Music in Space: A Study on Music Appreciation with Spatial Mapping", Miyagawa, Shoki & Koyama, Yuki & Kato, Jun & Goto, Masataka & Morishima, Shigeo, 2018, which is hereby incorporated by reference in its entirety. In some exemplary embodiments, the merging of the streams may be based on the virtual spatial mapping and the virtual relative location of the music source associated with each stream. In some exemplary embodiments, the merging of the streams may or may not be configured to restore the effects of unequal distances from the recorder and the directions from which the sounds arrive, which may be selected or determined by the performers. In some exemplary embodiments, when sound of a particular performer is used, it may be used in the audio stream while preserving a selected virtual location of that performer, while simulating a different virtual location, regardless of a virtual location allocated to the performer, or the like.

On Step 340, a next group in the group hierarchy may be iteratively activated in accordance with the order or hierarchy defined between the groups, until reaching a last audience group which may not be activated. In some exemplary embodiments, in case a next group is configured to actively participate in the performance, the next group may be provided with a merged media stream that includes all of the obtained performances of the previous groups, e.g., in a next iteration of Step 310.

In some exemplary embodiments, Steps 310-330 may be performed iteratively for each subsequent group that is activated, excluding or including one or more last audience groups. In case no additional group of participants exist, or in case a last group is not configured to participate actively in the performance, the method may be terminated. In some exemplary embodiments, while Steps 310-330 are performed, the participants of the groups may continue to perform, while each recorded segment of the first group's audio triggers a new iteration of FIG. 3, for the remaining groups.

In some exemplary embodiments, the implementation of the disclosed subject matter may enable every person in a group to hear or perceive the performance of all people in preceding groups, but not of people in his group or in succeeding groups. In some exemplary embodiments, the number of performing people that can be heard by an active group may be increased in each iteration. In some exemplary embodiments, the number of performing people in each group may increase as they are lower in the hierarchy. In some exemplary embodiments, upon completing the activation of all relevant groups, timestamps of the group communications and of the group members may be utilized to synchronize the subsequent performance.

Figure 4A:
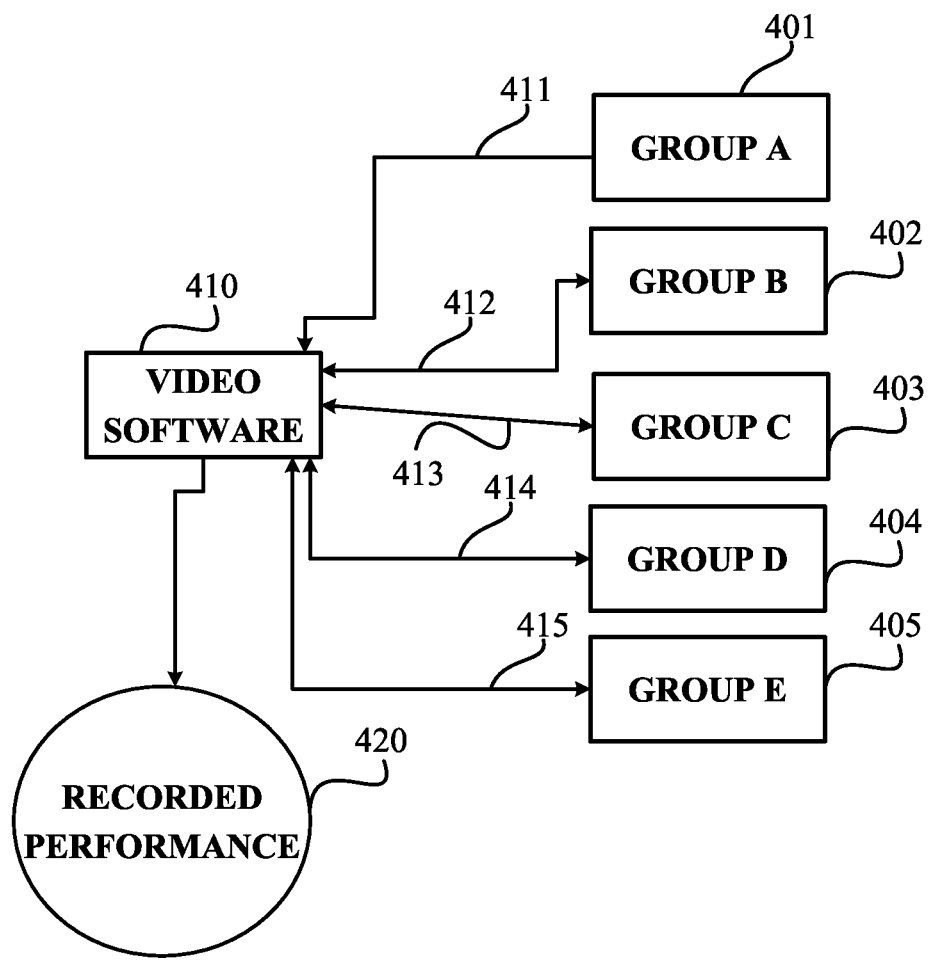
FIG. 4A shows a schematic illustration of a video conferencing configuration, in accordance with some exemplary embodiments of the disclosed subject matter.

Referring now to FIG. 4A showing a schematic illustration of a video conferencing configuration, in accordance with some exemplary embodiments of the disclosed subject matter.

In some exemplary embodiments, a Video Software 410 may conduct a virtual conference with groups of participants, e.g., Groups 401, 402, 403, 404, and 405. In some exemplary embodiments, Video Software 410 may correspond to Central Control 102 (FIG. 1). In some exemplary embodiments, the participants and audience of the virtual conference may be divided into Groups 401, 402, 403, 404, and 405, denoted Groups A, B, C, D, and E, such that each group comprise at least one participant.

In some exemplary embodiments, each group may be activated sequentially for a defined time period. In some exemplary embodiments, participants of Group 401 may perform an initial audio performance, which may be recorded and accumulated according to units of time segments. In some exemplary embodiments, the initial time segment of the performance may be recorded and provided as an initial Stream 411, depicted output arrow, to Video Software 410. In some exemplary embodiments, as members of Group 401 may continue to perform, subsequent time segments of the performance may be recorded and provided as an initial Stream 411 to Video Software 410. In some exemplary embodiments, Stream 411 may comprise a one-directional output stream from Group 401 to Video Software 410.

In some exemplary embodiments, while Group 401 is active, the performances in Stream 411 may be merged by Video Software 410, and provided to a next group, e.g., Group 402. In some exemplary embodiments, the following groups, e.g., Groups 402, 403, 404, and 405, may each be provided with a merged stream merging the performances of the previous groups, and may provide an output stream with a recorded performance of the group participants, to Video Software 410. In some exemplary embodiments, the subsequent groups may thus communicate data to and from Video Software 410 in a bi-directional communication flow, e.g., via Streams 412, 413, 414, 415, or the like.

In some cases, one or more groups in the lowest hierarchy level, such as Group 405, may include a passive audience that may not provide any output stream. In some exemplary embodiments, a passive audience may be provided with an audio stream that includes a merged performance of all of the previous groups, without providing any output stream to Video Software 410. For example, Stream 415 in the direction from Group 405 to Video Software 410 may be excluded in case Group 405 is an audience of a performance that is not intended to participate in the performance but to merely listen to the performance. In other cases, one or more groups in the lowest hierarchy level, such as Group 405, may comprise an output stream, such as in case the users in those groups are intended to participate in the performance, e.g., in real time or for future usages. For example, Stream 415 of data from Group 405 to Video Software 410 may be included in case Group 405 is an active audience of the performance that is intended to actively participate in the performance, in case the voices of the crowd are also captured, in case Group 405 is not an audience but rather a performing group, or the like. For example, it may be desired to create a record of the entire performance including some crowd noise from the audience. This may be implemented by recording noises from users in the audience group, turning Stream 415 to a bi-directional stream.

In some exemplary embodiments, Video Software 410 may be configured to merge the received streams, e.g., from different participants of a same group, from a previous group with performances of a subsequent group, or the like, using one or more methods or processes. In some exemplary embodiments, Recorded Performance 420 may generate a merged audio file from the performing groups, e.g., Groups 401, 402, 403, 404, including or excluding Group 405. In some exemplary embodiments, Video Software 410 may be configured to merge the received streams based on embedded timestamps, automatically based on positioning performed musical pieces within a known musical piece, or the like.

In some exemplary embodiments, Video Software 410 may merge one stream with another based on embedded time indications in each stream. In some exemplary embodiments, when an audio track is first recorded, it may be marked with timing indications such as a timestamp of the recording, e.g., indicating a timing of a start of the record, a duration of the record, an end of the record, or the like. In some exemplary embodiments, the timing indications may be embedded within the audio file, a video file comprising the audio, metadata of the media that is external to the media file, a combination thereof, or the like. In some exemplary embodiments, the timing signature of a record may be assigned or marked by a portion of Video Software 410 within the end device, by another client agent capturing the user's performance, by a hardware agent, or the like. For example, a timing mark may be injected to a stream that has a time segment length of 0.5 seconds, e.g., each 0.5 seconds. According to this example, the pace setter, which may not have a latency and may perform immediately, may produce a sound performance in which a timing mark may be included for each 0.5 seconds of the performance. In a second group, a first performer who may have a roundtrip latency of 0.2 seconds, may obtain a media portion from the pace setter after the 0.2 seconds latency and the 0.5 seconds of the initial performance of the media portion at the pace setter. Thus, the addition of the first performer to the media portion may marked with a timestamp only after 0.7 (0.2+0.5) seconds, when the audio portion arrives at the first performer. A second performer who may have a roundtrip latency of 0.3 seconds, may obtain a media portion from the pace setter after the 0.3 seconds latency and the 0.5 seconds of the initial performance of the media portion at the pace setter. Thus, the audio addition of the second performer to the media portion may marked with a timestamp only after 0.8 (0.3+0.5) seconds.

In some exemplary embodiments, the streams may be aligned based on the timing mark, enabling to merge streams with different latencies. In some exemplary embodiments, the streams with the timing marks may be merged, e.g., at Video Software 410, by synchronizing a time-wise offset of the streams. With respect to the previous example, the stream of the pace setter may be merged with the streams of the first and second performers of the next group, in a manner that merges the 0.5 second delay of the pace setter's stream with the 0.7 seconds delay of the first performer's stream and with the 0.8 seconds delay of the second performer's stream, aligning the offsets of the delay.

In some exemplary embodiments, Video Software 410 may be configured to merge the received streams based on locating a position of each audio stream within a known performed piece, e.g., a target musical piece. In some exemplary embodiments, this mapping may be performed in case the musical piece that is performed is a known piece or has an available record prior to the real-time performance. In some exemplary embodiments, Video Software 410 may map the position of each stream with respect to a musical piece using one or more techniques such as deep learning modules, artificial neural networks, predictors, classifiers, or the like, e.g., similarly to the description of "Using Deep Learning To Create A Digital Sheet Music Stand", Bettina Bhend, which is hereby incorporated by reference in its entirety. In some exemplary embodiments, mapping each stream of a performer to a musical piece may comprise recognizing which part of the piece is being sung or played by the performer creating the audio stream, e.g., according to the performer's role in the performance, and aligning the determined positions of the obtained audio streams so that they can be merged correctly.

In some exemplary embodiments, the merging of the streams may be based on a virtual spatial mapping and a virtual relative location of the music source associated with each stream. In some exemplary embodiments, Video Software 410 may be configured to merge the streams and provide each member of a group a potentially different stream, e.g., according to the virtual position of the member, the virtual position of the source stream in previous groups, or the like. In some exemplary embodiments, Video Software 410 may create several streams, and each member may receive a stream corresponding her preference, role, singing sub-group (e.g., Soprano), or the like. In such a case, a limited number of different streams may be generated and streamed to the members of the relevant group. In case the performance is performed by an orchestra, whose members are in a group, a same audio stream may be provided to all members of the group, or alternatively, a different stream may be provided to some group members. In some cases, virtual positions of the orchestra members may be determined, and each member may receive an audio stream that matches her virtual position. In such an embodiment, one or more members of the group may obtain and be enabled to hear a unique and different soundtrack according to its selected location.

Figure 4B:
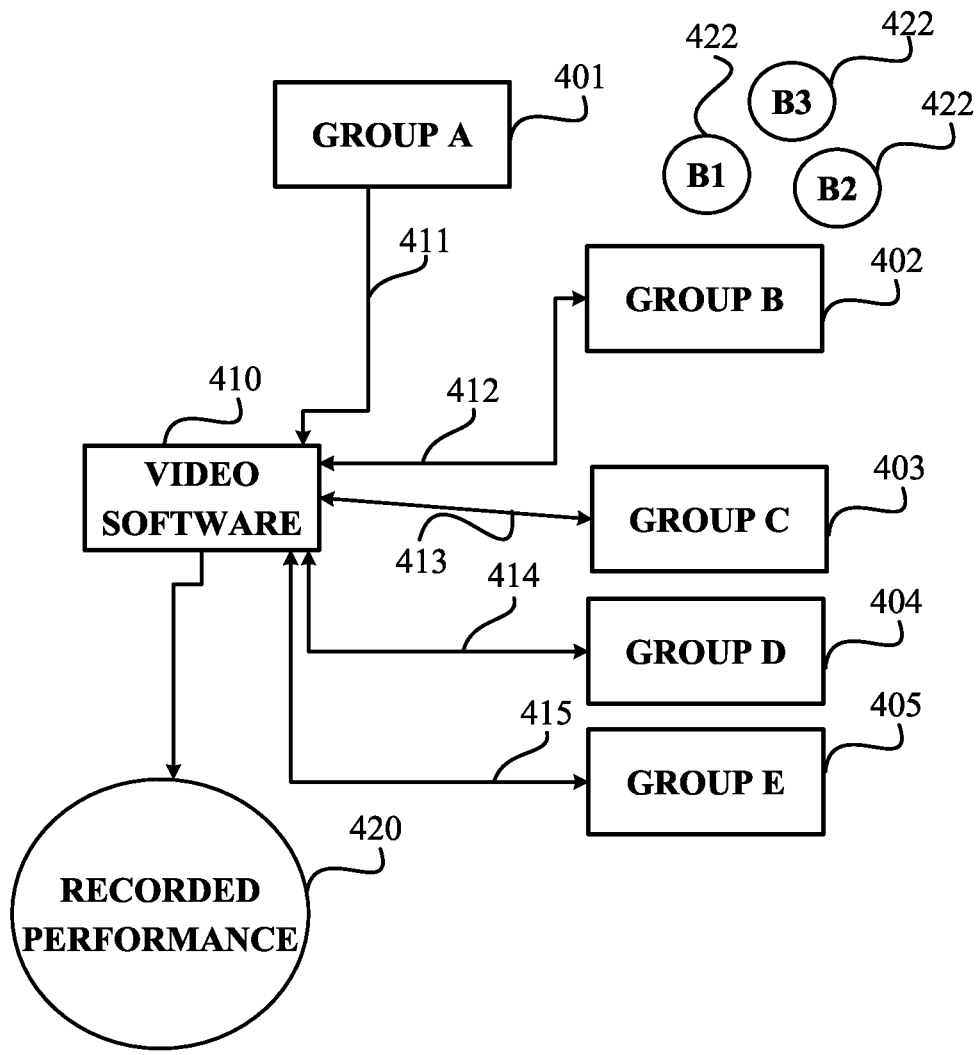
FIG. 4B shows a schematic illustration of a video conferencing configuration, in accordance with some exemplary embodiments of the disclosed subject matter.

Referring now to FIG. 4B showing a schematic illustration of a video conferencing configuration, in accordance with some exemplary embodiments of the disclosed subject matter. In some exemplary embodiments, the components of FIG. 4B may correspond to those of FIG. 4A.

In some exemplary embodiments, different sub-groups of a single group, e.g., Group 402, may receive different streams although sharing a same group latency. In some exemplary embodiments, members of Group 402, such as members of its Sub-Groups 422, may receive a different respective stream. For example, each sub-group may be provided with a stream that matches a virtual position of its members, a stream that matches a role of its members, or the like. In some exemplary embodiments, Sub-Groups 422 may share the fact that they are all presented with media streams that have a same delay, and that their output stream is presented with a larger delay to participants of a subsequent group.

Figure 5:
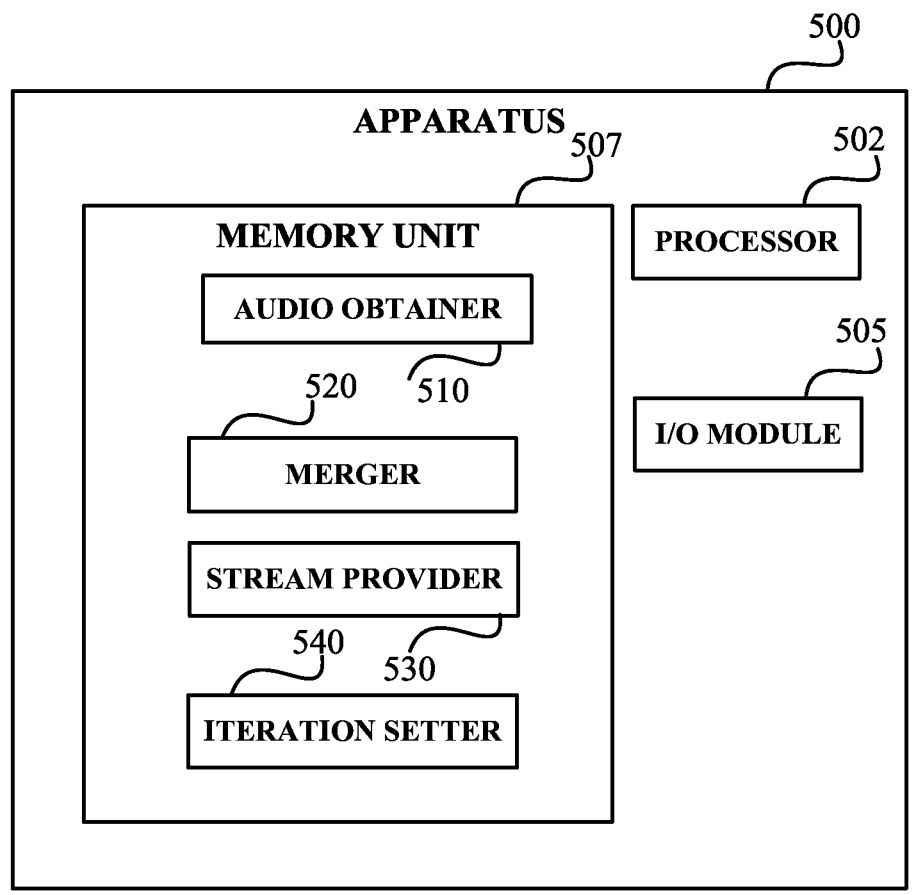
FIG. 5 shows a block diagram of an apparatus, in accordance with some exemplary embodiments of the disclosed subject matter.

Referring now to FIG. 5 illustrating an exemplary block diagram of an apparatus, in accordance with some exemplary embodiments of the disclosed subject matter.

In some exemplary embodiments, an Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of its subcomponents. Processor 502 may be configured to execute computer-programs useful in performing the methods of FIGS. 2-3, or the like.

In some exemplary embodiments of the disclosed subject matter, an Input/Output (I/O) Module 505 may be utilized to provide an output to and receive input from a user. I/O Module 505 may be used to transmit and receive information to and from the user or any other apparatus, e.g., a plurality of user devices, in communication therewith.

In some exemplary embodiments, Apparatus 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500. In some exemplary embodiments, Memory Unit 507 may retain program code operative to cause Processor 502 to perform acts associated with any of the steps in FIGS. 2-3, or the like.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Audio Obtainer 510 may be configured to obtain audio recordings from one or more user devices of a group, e.g., via I/O Module 505 or via any other component or device. Audio Obtainer 510 may be configured to obtain records from group members for a defined time segment, e.g., every 5 seconds.

In some exemplary embodiments, Merger 520 may obtain the group records from Audio Obtainer 510, and merge them with each other to create a single audio stream. In case the group is not a first group in a latency hierarchy, e.g., the pace setter, Merger 520 may merge a previous output audio from the previous groups with the group records from Audio Obtainer 510. In some exemplary embodiments, Merger 520 may or may not insert timestamps within the group records. In some cases, timestamps may be automatically embedded within audio stream at each end device that records an audio stream, e.g., by a recorder.

In some exemplary embodiments, Stream Provider 530 may provide the merged audio stream created by Merger 520 to members of a next group, e.g., in case a next group exists.

In some exemplary embodiments, Iteration Setter 540 may determine whether the next group, to which the merged stream was provided by Stream Provider 530, is configured to add an audience portion or layer to the final performance. In case the next group is configured to participate actively in the performance, Iteration Setter 540 may activate the group and initiate a new iteration of a synchronizing process by indicating to Audio Obtainer 510 that audio is to be obtained from members of the group.

In one scenario, a performance may comprise performing a three-minute song, and a delay between performing group may comprise a 1 second delay. A first group in the hierarchy may comprise only a lead singer, who may start to sing or perform first. Audio Obtainer 510 may obtain a media stream from the lead singer, an upon identifying that a defined time segment of the media stream has been performed, the audio portion may be extracted. At this stage, Stream Provider 530 may not provide any stitched audio records to the first group, as the performance may comprise a single collected stream from one node (the lead singer). Optionally, a timing marker may be added to the recorded audio portion of the lead singer by Audio Obtainer 510, by a recording component, or the like. Stream Provider 530 may stream the audio portion of the lead singer to members of a next group, e.g., a second group, which may arrive at the second group one second later, after the 1 second delay. Each member of the second group may be streamed with the singing of the lead singer alone. Each member of the second group may add their performance to the obtained audio portion such as by singing along with the lead singer, adding an additional harmony to the audio portion, or the like. Audio Obtainer 510 may obtain a media streams from each member of the second group for an allocated maximal latency threshold, e.g., corresponding to the size of the audio portion. For example, the audio portion may have a length of 0.8 seconds, the maximal latency threshold may be set to 0.8 seconds, and, during this timeframe, the performance of 9 members of the second group may be recorded, while audio records from other members may not be obtained.

The resulting recordings of the second group may be streamed to an intermediate control such as Merger 520 with a latency that is different than the latency of the pace setter, e.g., a latency that corresponds to recording the pace setter, communicating the recording, and adding records from the second group. Merger 520 may receive from Audio Obtainer 510 records that were recorded prior to the maximal latency threshold, e.g., during a timeframe of 0.8 seconds. In some exemplary embodiments, Merger 520 may merge the obtained records with the audio portion from the lead singer. In some exemplary embodiments, in case records from 9 members were obtained, Merger 520 may merge the 9 received streams with the stream of the lead singer, thereby producing a single stream that comprises performances of the sole member of the first group with the members of the second group who performed on time, e.g., during the allocated timeframe.

In some exemplary embodiments, one second later (two seconds after the performance started), Stream Provider 530 may provide or stream the produced single stream to members of a next group in the hierarchy, e.g., third group. This may be the case in case the merging and communication consumed 0.4 seconds together, and each recording was 0.8 seconds. However, any other time may be consumed. In some exemplary embodiments, Stream Provider 530 may provide to each member of the third group a record depicting sounds of 10 people, including the lead singer and the nine members of the second group, thereby enabling them to join the performance such as by singing along the streamed audio.

In some exemplary embodiments, Audio Obtainer 510 may obtain a media stream from each member of the third group for an allocated timeframe, e.g., a different or identical timeframe as used for the first or second group. For example, Audio Obtainer 510 may obtain audio records of members of the third group that were recorded prior to a maximal latency threshold of 0.8 seconds. Merger 520 may merge the obtained records together with the previous stream, to obtain an updated media stream of all three groups. In some cases, this process may continue iteratively for each group that is intended to participate in the performance, e.g., as determined by Iteration Setter 540.

In some exemplary embodiments, the number of performing people in each group may increase as they are lower in the hierarchy. Alternatively, the number of performing people in each group may decrease as they are lower in the hierarchy. Alternatively, the number of performing people in subsequent groups in the hierarchy may have an equal number of members. In some exemplary embodiments, the number of performing people in each group may not be correlated with the group hierarchy or order. For example, a first group in the order may comprise 1 member, the second group in the order may comprise 15 members, and the third group in the order may comprise 4 members.

In one scenario, in case 45 people are members of the third group, they may produce an audio record within an 0.8 seconds timeframe, and Merger 520 may stitch their audio records with the previous stream, creating a new stream that includes the voices of 55 people altogether (1+9+45). In the next iteration, this media stream of 55 people may be streamed to members of a next group, e.g., a fourth group, and so on. In this scenario, 5 seconds after the lead singer of finishes the performed song portion, so will the people in a fifth group, and the result may be merged together by Merger 520 so that an audience can be provided with a synchronized performance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   synchronizing an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises:
   obtaining a first audio stream based on one or more first audio records from one or more participants of the first group, wherein the one or more first audio records are obtained via the virtual conference system;
   providing the first audio stream to the second group via the virtual conference system, wherein the first audio stream is not provided to the one or more participants of the first group and is not provided to the third group, whereby one or more participants of the second group are enabled to consume content of the first audio stream;
   obtaining a second audio stream based on one or more second audio records from the one or more participants of the second group and based on the first audio stream, wherein the one or more second audio records are obtained via the virtual conference system; and
   providing the second audio stream to one or more participants of the third group via the virtual conference system, whereby the second audio stream is not provided to the first group, whereby the second audio stream is not provided to the second group, whereby the one or more participants of the third group are enabled to consume the second audio stream.

2. The method of claim 1 comprising iteratively performing said synchronizing for each time segment of the audio-based performance, wherein participants of the first and second groups are enabled to continue to perform the audio-based performance without interruption and within a time difference between the first group and the second group.

3. The method of claim 1, wherein the pre-determined order of the groups provides an order of the groups from a minimal number of participants to a maximal number of participants.

4. The method of claim 1, wherein said obtaining the second audio stream comprises:
   obtaining the one or more second audio records from the one or more participants of the second group, wherein the one or more second audio records are obtained within a maximal latency threshold, whereby dropping at least one audio record received after the maximal latency threshold; and
   merging the first audio stream with the one or more second audio records, thereby obtaining the second audio stream.

5. The method of claim 1, wherein the virtual conference system comprises a video conference system.

6. The method of claim 1 comprising providing a background sound to the first group, whereby the one or more participants of the first group are enabled to consume the background sound during said obtaining the first audio stream.

7. The method of claim 6 comprising removing the background sound from the first audio stream prior to said providing the first audio stream to the second group.

8. The method of claim 1, wherein the audio-based performance comprises a sing-along virtual event.

9. The method of claim 1, wherein the remote locations comprise one or more of the group consisting of: different countries, different cities, different streets, different apartments, and different rooms.

10. The method of claim 1, wherein the first group comprises an initial pace setter, wherein the pace setter is not exposed to audio records from any other participant.

11. The method of claim 1, wherein a last group of the pre-determined order comprises an audience, whereby the audio-based performance is provided to the audience.

12. An apparatus comprising a processor and coupled memory, said processor being adapted to:
synchronize an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises:
obtaining a first audio stream based on one or more first audio records from one or more participants of the first group, wherein the one or more first audio records are obtained via the virtual conference system;
providing the first audio stream to the second group via the virtual conference system, wherein the first audio stream is not provided to the one or more participants of the first group and is not provided to the third group, whereby one or more participants of the second group are enabled to consume content of the first audio stream;
obtaining a second audio stream based on one or more second audio records from the one or more participants of the second group and based on the first audio stream, wherein the one or more second audio records are obtained via the virtual conference system; and
providing the second audio stream to one or more participants of the third group via the virtual conference system, whereby the second audio stream is not provided to the first group, whereby the second audio stream is not provided to the second group, whereby the one or more participants of the third group are enabled to consume the second audio stream.

13. The apparatus of claim 12, wherein the processor is adapted to iteratively perform said synchronizing for each time segment of the audio-based performance, wherein participants of the first and second groups are enabled to continue to perform the audio-based performance without interruption and within a time difference between the first group and the second group.

14. The apparatus of claim 12, wherein said obtaining the second audio stream comprises:
obtaining the one or more second audio records from the one or more participants of the second group, wherein the one or more second audio records are obtained within a maximal latency threshold, whereby dropping at least one audio record received after the maximal latency threshold; and
merging the first audio stream with the one or more second audio records, thereby obtaining the second audio stream.

15. The apparatus of claim 12, wherein the processor is adapted to provide a background sound to the first group, whereby the one or more participants of the first group are enabled to consume the background sound during said obtaining the first audio stream.

16. The apparatus of claim 12, wherein the first group comprises an initial pace setter, wherein the pace setter is not exposed to audio records from any other participant.

17. The apparatus of claim 12, wherein a last group of the pre-determined order comprises an audience, whereby the audio-based performance is provided to the audience.

18. The apparatus of claim 12, wherein the remote locations comprise one or more of the group consisting of: different countries, different cities, different streets, different apartments, and different rooms.

19. The apparatus of claim 12, wherein the virtual conference system comprises a video conference system.

20. A computer program product comprising a non-transitory computer readable medium retaining program instructions, which program instructions when read by a processor, cause the processor to:
synchronize an audio-based performance between groups of participants, wherein the audio-based performance is streamed in real time via a virtual conference system, wherein at least some participants of the groups are physically located in remote locations, wherein the groups are ordered in accordance with a pre-determined order, wherein the pre-determined order indicates that a first group immediately precedes a second group, wherein the pre-determined order indicates that the second group immediately precedes a third group, wherein said synchronizing comprises:
obtaining a first audio stream based on one or more first audio records from one or more participants of the first group, wherein the one or more first audio records are obtained via the virtual conference system;
providing the first audio stream to the second group via the virtual conference system, wherein the first audio stream is not provided to the one or more participants of the first group and is not provided to the third group, whereby one or more participants of the second group are enabled to consume content of the first audio stream;
obtaining a second audio stream based on one or more second audio records from the one or more participants of the second group and based on the first audio stream, wherein the one or more second audio records are obtained via the virtual conference system; and
providing the second audio stream to one or more participants of the third group via the virtual conference system, whereby the second audio stream is not provided to the first group, whereby the second audio stream is not provided to the second group, whereby the one or more participants of the third group are enabled to consume the second audio stream.

\* \* \* \* \*